United States Patent Office  3,094,370
Patented June 18, 1963

3,094,370
METHOD OF TREATING LEATHER WITH POLYFLUOROPOLYHALO GEM-DIOLS
William D. Nicoll, Wilmington, Del., assignor to E. I. du Pont de Nemours and Company, Wilmington, Del., a corporation of Delaware
No Drawing. Filed Dec. 13, 1961, Ser. No. 159,160
12 Claims. (Cl. 8—94.21)

This invention relates to, and has as its principal objects provision of, a new process for treating leather to improve its properties and the improved and modified leather obtained by this treatment.

An ever present goal of the leather industry is to improve the physical properties of leather such as its resistance to scuffing and cracking and its break, its resistance to penetration by water and oil, its surface texture, etc. Nonmechanical processes have been proposed whereby the very important property of scuff or abrasion resistance can be improved, these processes generally involving impregnation of the leather with a filler material such as a polymeric material, but such processes have the disadvantage that they normally produce an impairment in the crack and break resistance.

It has now been found, according to this invention, that the scuff resistance of leather can be very considerably improved without any detrimental effect on the crack resistance and break. On the contrary, these properties also generally benefit from the treatment. In some embodiments of the invention, other properties such as water and oil resistance are also improved.

This invention provides a process for improving the properties of leather which comprises treating the leather with a polyfluoropolyhalo gem-diol wherein the halogen atoms are fluorine or chlorine, said gem-diol having one of the formulas (I)

and
(II)
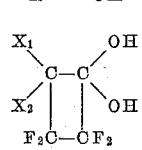

where R and R' are fluoroperhalomethyl or difluoromethyl radicals or perfluoroalkyl, ω-chloroperfluoroalkyl or ω-hydroperfluoroalkyl radicals of 2 to 6 carbon atoms, and $X_1$ and $X_2$ are fluorine or chlorine. Some of these gem-diols are toxic and should be handled with care.

In an important embodiment of the invention, the polyfluoro gem-diol used to treat the leather contains dissolved therein a high molecular weight, essentially linear synthetic polymer.

The invention also comprises, as a new product, leather treated with a polyfluoro gem-diol as defined above and containing, bound thereto, an effective amount of said polyfluoro gem-diol.

The gem-diols defined above may alternatively be referred to as hydrates of the polyfluoroketones of the formula (III)

and
(IV)

where R and R' and $X_1$ and $X_2$, which may be alike or different, have the above-stated significance. For reasons of greater effectiveness as leather treating agents and of accessibility, the preferred polyfluoroketone hydrates are those corresponding to the polyfluoroperhaloacetones, i.e., the compounds of Formula I in which R and R', which again may be alike or different, are fluoroperhalomethyl, i.e., trifluoromethyl, chlorodifluoromethyl, or dichlorofluoromethyl.

The ketone hydrates defined by Formulas I and II are generally prepared from the corresponding ketones by treatment with water. Some of these ketones and hydrates have been reported in the literature and can be prepared by the described methods, e.g., those of U.S. Patent 2,807,646; 2,853,524 or 2,980,738. Others are obtainable by methods described in copending patent applications, as follows:

The acyclic polyfluoroketones can be prepared, as described in application Serial No. 730,266, filed by D. W. Wiley on April 23, 1958, by the reaction, in a molar ratio of at least 2:1, of an ester of a polyfluoroalkanecarboxylic acid with an alkali metal alkoxide at temperatures below about 100° C., followed by acidification with a mineral acid. This reaction gives the ketones and/or their hydrates, i.e., the gem-diols.

The polyfluoroperhalocyclobutanones, i.e., the products of Formula IV, can be prepared by the method described in application Serial No. 43,331, filed by D. C. England on July 18, 1960. This method comprises the hydrolysis with sulfuric acid of about 75-98% strength at a temperature of 125-300° C. of the 2,2-dihalo-1,3,3,4,4-pentafluorocyclobutyl hydrocarbyl ethers of the formula

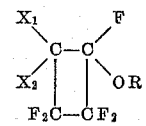

where $X_1$ and $X_2$ are fluorine or chlorine and R is a hydrocarbon radical. These ethers are themselves prepared by cycloaddition at 125-250° C. of the requisite perhaloolefin $CF_2=C(X_1X_2)$ and a perfluorovinyl hydrocarbyl ether $CF_2=CFOR$. The hydrolysis step yields the polyfluoroperhalocyclobutanones and/or their hydrates.

Specific polyfluoro gem-diols suitable for use in the treatment of leather according to this invention include the following:

Perfluoro(2,2-propanediol)

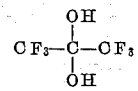

1,3-dichloro-1,1,3,3-tetrafluoro-2,2-propanediol

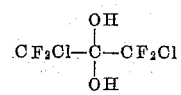

1,1,3-trichloro-1,3,3-trifluoro-2,2-propanediol

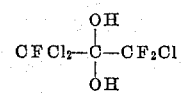

1,1,3,3-tetrachloro-1,3-difluoro-2,2-propanediol

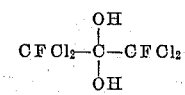

Perfluoro(3,3-pentanediol)

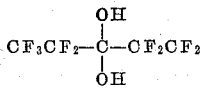

1,5-dichlorooctafluoro-3,3-pentanediol

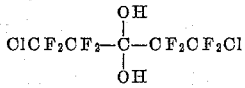

1-chloro-4-(trifluoromethyl)-octafluoro-3,3-pentanediol

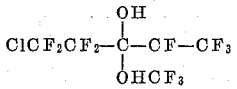

Perfluoro(4,4-heptanediol)

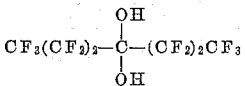

Perfluoro(2,6-dimethyl-4,4-heptanediol)

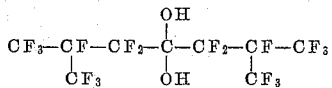

Perfluoro(7,7-tridecanediol)

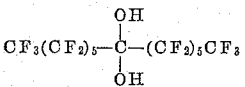

1,1,3,3-tetrafluoro-2,2-propanediol

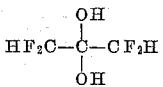

1H,5H-octafluoro-3,3-pentanediol

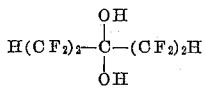

1H,7H-dodecafluoro-3,3-heptanediol

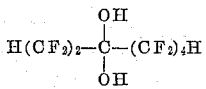

1H,9H-hexadecafluoro-5,5-nonanediol

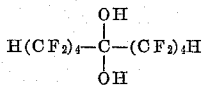

1H,13H-tetracosafluoro-7,7-tridecanediol

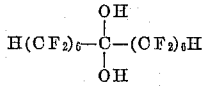

Perfluoro(1,1-cyclobutanediol)

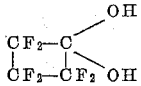

2-chloro-2,3,3,4,4-pentafluoro-1,1-cyclobutanediol

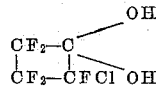

2,2-dichloro-3,3,4,4-tetrafluoro-1,1-cyclobutanediol

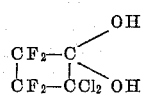

Most of the polyfluoroketone hydrates defined by Formulas I and II are liquids at ordinary temperature. Others are solids with relatively low melting points. Some polyfluoroketone hydrates are capable of forming more or less well defined higher hydrates containing from about 0.5 to about 1.5 moles, or sometimes up to 10 moles, of additional water. Such higher hydrates, which are entirely suitable for use in this process, are usually liquid at room temperature or below.

The impregnation of leather with these gem-diols can be conducted in the absence of any solvent, in which case the normally liquid products can be used at or below room temperature and the normally solid products are used at or above their melting point. This procedure is entirely satisfactory from the standpoint of improvement of the scuff resistance, but it generally produces appreciable shrinkage and stiffening of the leather (which effects, however, are not necessarily harmful and are even desirable in some applications). If shrinkage is to be avoided, it is recommended to use a solution of the gem-diol in a solvent liquid at the operating temperature. Additionally, the use of a solvent facilitates the impregnation in some instances, affords a saving in the quantity of gem-diol and permits operating at lower temperature with the solid products. The solvent can be, and preferably is, water, in which most of the suitable gem-diols are soluble in all proportions. It can also be an inert, neutral organic solvent such as a lower alkanol, an aromatic hydrocarbon, an aliphatic halohydrocarbon, a fluoroalkanol other than a gem-diol, an aliphatic or alicyclic ether, etc., or a mixture of water with a water-miscible organic solvent. When the gem-diol is used in solution, the lower limit of concentration in the solution required for each individual gem-diol to produce significant improvements can readily be ascertained by testing the scuff resistance of the treated leather, for example by the procedure described later on. In general, it is desirable that the solution contain at least 30% by weight of the gem-diol.

The temperature at which the treatment of leather is conducted is not critical. It is only necessary that the impregnating composition, whether the polyfluoro gem-diol is used alone or in a solvent, be a homogeneous liquid at the operating temperature. For reasons of convenience, it is preferred to operate at or near room temperature whenever possible, but elevated temperatures, e.g., up to 100° C., can be used equally well. The preferred temperature range is that between 0 and 75° C.

Penetration of the leather by the polyfluoro gem-diol is very rapid. In general, it is sufficient to maintain the leather in contact with the impregnating liquid for a short period, e.g. from 10 seconds to 5 minutes, at the operating temperature. A preferred method of impregnation consists in applying a roller to the surface of the leather to expel air while the leather is immersed in the treating bath. This method was used in most of the examples given below.

After treatment with the polyfluoro gem-diol with or without a solvent, the excess liquid is removed from the leather by any suitable means such as pressing, nipping between rolls, centrifuging, etc. The leather can then be dried without any intervening treatment, for example by hanging it in air at room temperature, or by moderate heating in an oven, e.g., up to 100° C., if desired under reduced pressure. This removes substantially all of the solvent, if any was used, and part of the absorbed gem-diol. However, it is generally preferred first to subject the leather to a liquid washing or extracting treatment until the washing liquid is substantially free of extracted gem-diol. This washing treatment is preferably performed with water at a temperature not exceeding about 40° C., although an organic solvent for the gem-diol, or a mixture of such a solvent and water, can be used. The purpose of this treatment is to prevent or minimize shrinkage and stiffening of the leather, which may sometimes occur to some extent in the absence of such a treatment.

On subsequent drying, it is found that, even after prolonged washing with cold or lukewarm water, part of the polyfluoro gem-diol remains bound to the leather, as shown by an appreciable weight gain. Leather treated according to this invention shows a significant increase in scuff resistance when the weight gain on a dry basis, following immersion in water at 20° C. for two hours, is at least 1%. Generally it is at least 3% and may be as high as 25%. The weight gain prior to the washing treatment but after removal of any excess liquid, evaporation of any solvent and drying, is, of course, higher. The amount of gem-diol present in the leather can also be determined by analyzing the leather for fluorine. However, it is not readily possible to state the minimum amount of fluorine present in the treated articles since this depends on the chemical composition of the gem-diol employed.

In a modification of the procedure described above, the surface of the leather is sprayed or swabbed with a rather dilute aqueous solution, of the order of about 10% by weight, of the polyfluoro gem-diol, and the treated leather is dried in air without washing. This procedure also gives good results with respect to improved break and to tightening of the grain.

The result of the treatment with a polyfluoro gem-diol is a very substantial improvement in the scuff resistance of the leather, without any impairment in its break and resistance to cracking. In some instances, surface effects are also noted. For example, suede leather treated by the described process shows a tighter nap and better ability to withstand buffing. The treated leather tends to be somewhat more water-sensitive than the original leather because the natural oils in the leather are partly removed by the treatment. However, this is easily corrected, if necessary, by an after-treatment with animal or vegetable oils such as neat's-foot oil, fish oil or castor oil or with light viscosity mineral oil, or with mixtures of such oils. Finishing treatments of this kind are widely used in the leather industry and present no problems.

The liquid compositions used for treating the leather can, of course, contain other ingredients dissolved or dispersed therein besides the polyfluoro gem-diol, such as acid acceptors, antioxidants, waxes, ultraviolet light absorbers, fillers or other additives. Special advantages are realized when these compositions contain organic colorants, i.e., dyes or pigments, for which the fluoroalcohols defined by Formulas I and II have been found to possess excellent dispersing or dissolving power. Solutions or intimate dispersions of a dye or pigment in a gem-diol as defined, with or without an added liquid medium such as water, lead to superior results in the dyeing of leather from the standpoint of extent and uniformity of penetration. When the gem-diol is used in an aqueous dye bath, the results are far better than those obtained when no gem-diol is present or when it is replaced by another water-miscible organic solvent for the dye. In such cases the concentration of the gem-diol in the dye bath can be quite low, for example 5% by volume. At higher concentrations of the order of 30% or higher, or when the gem-diol is used without additional liquid medium, other improvements in the leather such as increase in scuff resistance are also obtained simultaneously.

In an important embodiment of the invention, the polyfluoro gem-diol contains dissolved therein a substantially linear, high molecular weight synthetic polymer. It has been found that the products defined by Formulas I and II are capable of dissolving a wide variety of synthetic polymeric materials, even those polymers normally considered intractable and for which no, or very few, good solvents are available. In most instances, the polymer solutions can be made at room temperature or even below. Moderate warming is desirable in a few cases but the polymer remains in solution on cooling at room temperature.

The principal synthetic linear polymers of high molecular weight (of the order of at least 3000) that are soluble in the gem-diols of Formula I are those which contain oxygen and/or nitrogen atoms attached to carbon atoms. The technically most important of such polymers are those containing ester, amide, acetal, ether, cyano or hydroxyl groups, these groups being present in the polymer molecule in sufficient amount to impart the required solubility in the polyfluoro gem-diol. Representative classes of synthetic polymers suitable for the purposes of this invention include the following, it being understood that soluble copolymers are embraced by the generic term "polymer":

(1) The polyesters, i.e., the polymers containing the carbonyloxy group,

which may be intralinear or extralinear (pendant). These include the intermolecular condensation products of dibasic carboxylic acids such as carbonic, oxalic, adipic, sebacic, terephthalic or isophthalic acids and glycols such as ethylene, hexamethylene or decamethylene glycols; the intramolecular condensation products of hydroxyacids such as hydroxypivalic acid, α-hydroxyisobutyric acid or ω-hydroxycaproic acid; the polyesteramide; the polycarbamates (i.e., polyurethanes); the polymers of acrylic or methacrylic esters, such as polymethyl methacrylate; the polymers of vinyl carboxylates, such as polyvinyl acetate; etc.

(2) The polyamides, i.e., the polymers containing the carbonylamino group,

which may be intralinear or extralinear, and may be present in various combinations, for example as

(polyimides),

(polycarbamides or polyureas),

(polyoxamides);

(polyhydrazides) or

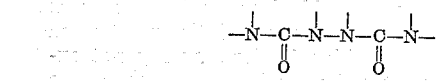

(polybis-ureylenes). These include the intramolecular condensation products of dibasic carboxylic acids such as carbonic, adipic, sebacic or terephthalic acids and diamines such as hexamethylenediamine, decamethylenediamine or di(p-aminocyclohexyl)methane; the intramolecular condensation products of aminoacids such as 6-aminocaproic acid, 11-aminoundecanoic acid, leucine or 1-aminocyclohexanecarboxylic acid; the polyesteramides; the polymers containing both amido and urethane (carbamate) linkages; the polyimides made from diprimary diamines and tir- or tetracarboxylic acids having two carboxyl groups attached to adjacent carbon atoms; the polymers of acrylic or methacrylic amides; etc.

(3) The polyacetals, i.e., the polymers containing the acetal linkage,

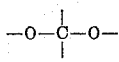

including the formaldehyde polymers; the condensation products of aldehydes and glycols such as polyhexamethylene formal, polyhexamethylene isobutyral; the polyvinyl acetals such as polyvinyl butyral; etc.

(4) The polyethers, i.e., the polymers containing the ether linkage,

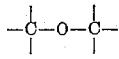

which may be intralinear, as in the condensation products of glycols or dihydric phenols, e.g., di(4-hydroxyphenyl)dimethylmethane and dihalides, e.g., dichlorodiethyl ether, or extralinear, as in the polymers of alkylvinyl ethers.

(5) The polymers containing cyano groups, especially the acrylonitrile polymers containing at least 85% by weight of polymerized acrylonitrile, and the corresponding alkacrylonitrile polymers such as polymethacrylonitrile.

(6) The polymers containing hydroxyl groups, especially the hydrolyzed vinyl carboxylate homopolymers (i.e., the polyvinyl alcohols) and the hydrolyzed vinyl carboxylate/ethylene copolymers wherein the ratio of vinyl carboxylate units to ethylene units is between 1:5 and 50:1, the degree of hydrolysis in said hydrolyzed polymers being at least 80%.

The preferred polymers for use in the leather-treating compositions of this invention are the condensation-type polyesters and polyamides, i.e., the polyesters and polyamides wherein the carbonyloxy or carbonylamino groups are intralinear; the formaldehyde polymers, and the acrylonitrile polymers.

A solution of the polymer in the polyfluoro gem-diol alone can be used. Or, if desired, one or more additional liquid medium may be present in the treating composition, such as the media mentioned above in connection with the treatment of leather with the gem-diol without any dissolved polymer. Thus, the treating composition may contain water, in amounts which may be quite large but insufficient to destroy the homogeneity of the solution, or it may contain organic solvents having some solvent power for the polymer, or organic solvents incapable of dissolving the polymer, again provided the composition remains homogeneous. However, the gem-diol should be present in substantial amounts, not less than 30% by weight and generally at least 35%, both to maintain the polymer in solution and to produce the desired improvements of the leather.

Leather impregnated with a high molecular weight polymeric material tends to be stiffer than untreated leather, the degree of stiffness being controlled by the concentration of the polymer in the treating solution. In order to prevent undesirable increase in stiffness, it is preferred that the concentration of the polymer in the total treating composition be low, usually not exceeding 5% by weight and more preferably not above 3%. Appreciable results are obtained with polymer concentrations as low as 0.1% by weight, the preferred range of concentration being between 0.2 and 1.0%.

The treatment of leather with a gem-diol solution of a synthetic polymer is effected under the conditions already described with respect to the treatment in the absence of a polymer. A subsequent washing step, as described above, is not essential, but is generally desirable if stiffening of the leather is to be avoided. In this embodiment also the treatment is conducted so as to insure a weight gain of at least 1% on a dry basis.

When leather is treated with a solution of a polymer in a polyfluoro gem-diol, the resulting product shows not only improved scuff resistance, but also other beneficial effects traceable to the use of the polymer. Thus, it is generally less permeable, as shown by higher resistance to penetration by oil or water, and it shows a smoother, velvety surface texture.

The process of this invention is applicable to any kind of leather and at any stage of manufacture after tanning, whether it be vegetable tanned leather, chrome tanned leather, leather treated with various salts such as sodium sulfate, barium chloride, magnesium sulfate or aluminum sulfate for "loading" or other purposes, etc. The origin of the leather, e.g., calfskin leather, side leather, sheepskin, kid leather, etc., is immaterial, as are the uses for which it is intended, e.g., upper leather, sole leather, upholstery leather, glove leather, luggage leather, etc.

The scuff resistance tests referred to above were made with a mechanical device consisting of a knife edge mounted on the end of a hooked arm driven by an eccentric, which produced a stroke two inches long on the surface of the leather. A mechanical counter recorded the number of passes which the knife edge made on the leather. In the case of unfilled side leather, such as was used in most of the examples which follow, one or two passes of the knife edge was sufficient to mar the leather noticeably, whereas leather treated as described in the examples showed a smooth, unscuffed appearance after 100 passes of the knife edge.

The crack test consisted in bending the leather double with the top side outermost and then again folding in a direction approximately at right angle to the initial bend. To pass this test the leather should show no crack in the top surface at any of the bends. The break test consisted in bending the leather sharply so that the top surface was inward. To pass this test the leather surface on unbending should show no permanent crease or break.

The following examples illustrate the invention. The ratios shown are by weight unless otherwise noted.

*Example I*

Unfilled side leather was immersed at room temperature for about 30 seconds in a 40/60 mixture of 1,3-dichloro-1,1,3,3-tetrafluoro-2,2-propandiol and water. After squeezing out the excess liquid, the leather was soaked in water for one hour, using three changes of water, then dried in air at room temperature. It had gained 7.3% in weight and contained 2.95% fluorine. The treated leather showed excellent break and excellent scuff and crack resistance, and a shrinkage of less than 5%.

When this treatment was performed with the anhydrous gem-diol, followed by immersion in water and drying at 70° C., the leather, which had gained 10.2% in weight, also showed improved scuff resistance, but was stiffer than the untreated leather.

*Example II*

Unfilled side leather was treated as in Example I with a solution consisting of 75% of perfluoro(2,2-propanediol) half hydrate, $(CF_3)_2C(OH)_2 \cdot \frac{1}{2}H_2O$, and 25% of water. The leather, after washing for two hours in several changes of water and drying, had gained 7.2% in weight and was markedly improved in break and in scuff and crack resistance.

*Example III*

A piece of unfilled side leather was immersed in a 50% aqueous solution of 1,1,3-trichloro-1,3,3-trifluoro-2,2-propandiol for about 30 seconds at room temperature. After pressing to remove the excess liquid, the leather was immediately soaked in water for two hours, renewing the water several times. After drying in air at room temperature, the leather showed a weight gain of 9.1%, good resistance to scuffing and only slight shrinkage.

Example IV

Unfilled side leather was treated as in Example III with a 50% aqueous solution of 1,1,3,3-tetrachloro-1,3-difluoro-2,2-propanediol, then soaked in water for 30 minutes and dried at room temperature. The dried leather showed a weight gain of 4%. It was found to have excellent resistance to scuffing and cracking and good break.

Example V

Unfilled side leather was immersed for about 30 seconds at room temperature in a solution prepared by dissolving perfluoro(1,1-cyclobutanediol) in 10% of its weight of water. The leather was then squeezed under a roller, washed in several changes of cold water, then immersed in water for about 16 hours, squeezed again and air-dried at room temperature. The treated leather showed a weight gain of 4.6% and had excellent break and scuff and crack resistance.

Example VI

Unfilled side leather was treated as described in Example V except that the treating solution consisted of 83% of 2,2-dichloro-3,3,4,4-tetrafluoro-1,1-cyclobutanediol and 17% of water. The dry treated leather showed a weight gain of 9.7% and its properties were similar to those of the leather of Example V.

Example VII

Unfilled side leather was immersed for about 30 seconds in anhydrous 1H,7H-dodecafluoro-3,3-heptane-diol, then soaked in water for 3 hours, blotted and air-dried. The dried leather had gained 16% in weight and showed a moderate improvement in scuff resistance, as well as increased stiffness. It was then treated with neat's-foot oil (1% based on the weight of the leather) by repeatedly passing the water-wet leather and the oil under a roller, then blotting it between sheets of absorbent paper and again air-drying. After this treatment the leather showed good scuff resistance as compared to a control and was pliable and soft.

Example VIII

A piece of unfilled side leather was immersed in a 1% solution of commercial polyhexamethyleneadipamide in a 50/50 mixture of 1,3-dichloro-1,1,3,3-tetrafluoro-2,2-propanediol and benzene at room temperature for about one minute. After squeezing out the excess solution by rolling the leather on a smooth surface, the leather was air-dried, then soaked in several changes of water for about two hours. After redrying in air, the treated leather showed a smooth surface and but very slight stiffening. It had good resistance to scuffing and to penetration by water.

Example IX

A 3% solution of a high molecular weight commercial polyacrylonitrile in 1,3-dichloro-1,1,3,3-tetrafluoro-2,2-propanediol was used to impregnate leather essentially as described in Example VIII. After soaking in water and drying, the leather showed a weight gain of approximately 8%. The treated leather was rather stiff and had increased resistance to penetration by water. A scuffing test showed that it was markedly improved in scuff resistance in comparison to the untreated leather.

Example X

A solution was prepared containing 0.24% of commercial polyhexamethyleneadipamide in a mixture of 46% of 1,3-dichloro-1,1,3,3-tetrafluoro-2,2-propanediol, 12% of benzene and 42% of water. This solution was used to impregnate a piece of unfilled side leather in the manner already described. After washing with water and drying, the leather showed a weight gain of 16.3% and contained 2.53% fluorine. It had excellent break and resistance to scuffing and cracking.

Example XI

A piece of unfilled side leather was treated as described above with a 0.5% solution of commercial polyethylene terephthalate in a mixture of 55% of 1,3-dichloro-1,1,3,3-tetrafluoro-2,2-propanediol and 45% of water. The treated leather showed marked improvement in scuff and crack resistance and in break.

Example XII

Unfilled side leather was treated as described above with a 0.6% solution of a high molecular weight formaldehyde polymer in a mixture of 67% of 1,3-dichloro-1,1,3,3-tetrafluoro-2,2-propanediol and 33% of water. The scuff and crack resistance and the break of the treated leather were excellent.

Example XIII

A dye bath was prepared using as the solvent a mixture of, by volume, 28.5% of 1,3-dichloro-1,1,3,3-tetrafluoro-2,2-propanediol, and 71.5% of water. In this solution was dissolved 2.85% by weight of a red dye which was an organic salt of the dye having Colour Index No. 27290 (all references in this and the following examples are to the Colour Index, 2nd edition, 1956). A piece of suede kidskin was immersed in this bath at 45–50° C. for 15 seconds and the excess solution was immediately removed by squeezing the leather under a roller between pieces of absorbent paper. Penetration of the dye into the leather was excellent and much superior to that obtained in a control experiment using a larger amount of the same dye (5% by weight) in water.

Example XIV

A dye bath was prepared with 2% by weight of the brown dye C.I. No. 20195 dissolved in a mixture of, by volume, 5% of 1,3-dichloro-1,1,3,3-tetrafluoro-2,2-propanediol and 95% of water. Suede leather dyed by immersion in this bath at room temperature was an even, dark brown color and the dye penetrated the leather uniformly and deeply. Use of the same dye at the same concentration in water containing no gem-diol gave an equally good surface appearance but penetration of the dye into the leather was only slight.

Example XV

A very fine dispersion was prepared of 0.2% by weight of the blue copper phthalocyanine pigment having C.I. No. 74160 in perfluoro(2,2-propanediol) one-half hydrate, $(CF_3)_2C(OH)_2 \cdot \frac{1}{2}H_2O$. This dispersion was used to dye kid leather as described in Example XIII except that the temperature was about 25° C. The dispersed pigment penetrated the leather very well. After extracting with water to remove the excess gem-diol and drying at room temperature, the treated leather showed an even blue color and, in addition, improved resistance to scuffing. A similar test using a dispersion of the same pigment in a non-fluorinated alcohol showed very little penetration of the pigment, with most of the color adhering very loosely to the surface of the leather.

Example XVI

A solution was prepared containing 0.36% by weight of commercial polyhexamethyleneadipamide and 2.8% by weight of the dye used in Example XIII in a mixture of 70% of $(CF_3)_2C(OH)_2 \cdot \frac{1}{2}H_2O$ and 30% of water. This solution was used to dye a piece of suede leather by the procedure of Example XIII, after which the leather was washed with water and dried. The leather was well and uniformly dyed and, in addition, showed good resistance to scuffing.

Since obvious modifications and equivalents in the invention will be evident to those skilled in the chemical arts, I propose to be bound solely by the appended claims.

The embodiments of the invention in which an exclusive property or privilege is claimed are defined as follows:

1. The method of treating leather which comprises contacting the same with a gem-diol of one of the formulas

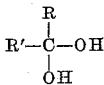

and

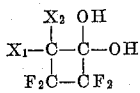

wherein R and R' are selected from the group consisting of fluoroperhalomethyl, difluoromethyl and perfluoroalkyl, ω-chloroperfluoralkyl and ω-hydroperfluoralkyl of 2–6 carbons and $X_1$ and $X_2$ are selected from the group consisting of fluorine and chlorine.

2. The method of claim 1 wherein the gem-diol is

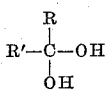

R and R' being fluoroperhalomethyl.

3. The method of claim 1 wherein the gem-diol is in admixture with water.

4. The method of treating leather which comprises contacting the same with 1,3-dichloro-1,1,3,3-tetrafluoro-2,2-propanediol.

5. The method of treating leather which comprises contacting the same with perfluoro(2,2-propanediol) half hydrate.

6. The method of treating leather which comprises contacting the same with 1,1,3-trichloro-1,3,3-trifluoro-2,2-propanediol.

7. The method of treating leather which comprises contacting the same with perfluoro(1,1-cyclobutanediol).

8. The method of treating leather which comprises contacting the same with 2,2-dichloro-3,3,4,4-tetrafluoro-1,1-cyclobutanediol.

9. The method of treating leather which comprises contacting the same with 1H,7H-dodecafluoro-3,3-heptanediol.

10. Leather carrying a gem-diol of one of the formulas

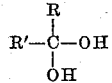

and

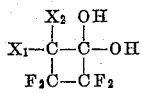

wherein R and R' are selected from the group consisting of fluoroperhalomethyl, difluoromethyl and perfluoroalkyl, ω-chloroperfluoroalkyl and ω-hydroperfluoroalkyl of 2–6 carbons and $X_1$ and $X_2$ are selected from the group consisting of fluorine and chlorine.

11. Leather carrying 1,3-dichloro-1,1,3,3-tetrafluoro-2,2-propanediol.

12. Leather carrying perfluoro(1,1-cyclobutanediol).

References Cited in the file of this patent
UNITED STATES PATENTS

| | | |
|---|---|---|
| 2,567,011 | Diesslin et al. | Sept. 4, 1951 |
| 2,635,059 | Cheronis | Apr. 14, 1953 |
| 2,693,458 | Olson | Nov. 2, 1954 |
| 2,765,287 | Aycock | Oct. 2, 1956 |
| 2,803,656 | Ahlbrecht et al. | Aug. 20, 1957 |
| 2,807,646 | Miller et al. | Sept. 24, 1957 |
| 2,828,220 | McWherter et al. | Mar. 25, 1958 |
| 2,853,524 | Miller et al. | Sept. 23, 1958 |
| 2,956,854 | Plapper et al. | Oct. 18, 1960 |
| 2,980,738 | Scribner | Apr. 18, 1961 |
| 3,015,585 | Holbrook et al. | Jan. 2, 1962 |
| 3,034,925 | De Marco et al. | May 15, 1962 |